(12) United States Patent
Scheich (10) Patent No.: US 12,126,774 B2
(45) Date of Patent: Oct. 22, 2024

(54) MOBILE PHOTOBOOTH

(71) Applicant: Carvana, LLC, Tempe, AZ (US)

(72) Inventor: Davo Scheich, Troy, MI (US)

(73) Assignee: Carvana, LLC, Tempe, AZ (US)

( * ) Notice: Subject to any disclaimer, the term of this patent is extended or adjusted under 35 U.S.C. 154(b) by 0 days.

(21) Appl. No.: 17/692,498

(22) Filed: Mar. 11, 2022

(65) Prior Publication Data

US 2022/0303408 A1  Sep. 22, 2022

Related U.S. Application Data (60) Provisional application No. 63/163,174, filed on Mar. 19, 2021.

(51) Int. Cl.
  *H04N 1/00* (2006.01)
  *E04H 1/12* (2006.01)
  (Continued)

(52) U.S. Cl.
  CPC ........... *H04N 1/00289* (2013.01); *E04H 1/12* (2013.01); *G03B 15/06* (2013.01);
  (Continued)

(58) Field of Classification Search
  None
  See application file for complete search history.

(56) References Cited

U.S. PATENT DOCUMENTS

| 4,545,630 A | 10/1985 | Izumi et al. |
| 4,804,983 A | 2/1989 | Thayer |

(Continued)

FOREIGN PATENT DOCUMENTS

| CN | 207560161 U | 6/2018 |
| DE | 202017002782 U1 | 6/2017 |

(Continued)

OTHER PUBLICATIONS

In Re Venner et al., No. 6391, LexisNexis; United States Court of Customs and Patent Appeals; Oral argument Nov. 7, 1958, Dec. 19, 1958.

(Continued)

*Primary Examiner* — James M Hannett
(74) *Attorney, Agent, or Firm* — SNELL & WILMER L.L.P.

(57) ABSTRACT

A system and method are provided for photographing vehicles in a deployable photobooth structure that avoids corner lighting issues common with angular shaped photobooths. The walls of the photobooth are made of an opaque fabric or panels. A frame supports photographic lighting, as well as rods from which the fabric that forms the walls is hung. The photobooth itself may be hung from a ceiling and deployed downward or retracted upward to a ceiling. The photobooth may also be mobile and used in outdoor settings. If not hung, vertical support legs may be used to support the frame above the floor or ground. Low volume car photos are obtained where a user walks about the inside perimeter of the photobooth and takes a series of photographs or video. The images or video may then be manipulated by computer to provide seamless reflection free 360 degree images.

20 Claims, 6 Drawing Sheets

(51) Int. Cl.
　　　*G03B 15/06*　　　(2021.01)
　　　*G06K 7/10*　　　(2006.01)
　　　*H04N 23/56*　　　(2023.01)
　　　*H04N 23/661*　　　(2023.01)

(52) U.S. Cl.
　　　CPC ......... *G06K 7/10415* (2013.01); *H04N 23/56* (2023.01); *H04N 23/661* (2023.01)

(56) References Cited

U.S. PATENT DOCUMENTS

| | | | |
|---|---|---|---|
| 4,918,321 A | | 4/1990 | Klenk et al. |
| 5,436,726 A | | 7/1995 | Ventura et al. |
| 5,446,515 A | | 8/1995 | Wolfe |
| 5,636,024 A | | 6/1997 | Crookham et al. |
| 5,726,705 A | | 3/1998 | Imanishi et al. |
| 5,778,258 A | * | 7/1998 | Zamoyski ............ G03B 15/06 396/4 |
| 6,012,825 A | | 1/2000 | Horner et al. |
| 6,147,752 A | | 11/2000 | Hewitt et al. |
| 6,266,138 B1 | | 7/2001 | Keshavmurthy |
| 6,320,654 B1 | | 11/2001 | Alders et al. |
| 6,513,941 B1 | * | 2/2003 | Perrier ............... G03B 15/06 362/17 |
| 6,778,097 B1 | | 8/2004 | Kajita et al. |
| 6,901,384 B2 | | 5/2005 | Lynch et al. |
| 6,950,807 B2 | | 9/2005 | Brock |
| 7,212,308 B2 | * | 5/2007 | Morgan ............... H04N 1/0019 358/1.18 |
| 7,954,953 B2 | | 6/2011 | Sprague |
| 8,050,735 B2 | | 11/2011 | Feke et al. |
| 8,112,325 B2 | | 2/2012 | Foy et al. |
| 9,037,968 B1 | | 5/2015 | Pringle et al. |
| 9,046,740 B1 | * | 6/2015 | Smithweck ........... G03B 15/06 |
| 9,113,784 B2 | | 8/2015 | Feke et al. |
| 9,302,190 B1 | | 4/2016 | Jennings |
| 9,412,203 B1 | | 8/2016 | Garcia |
| 9,429,817 B1 | | 8/2016 | Harder et al. |
| 10,311,636 B1 | | 6/2019 | Falstrup et al. |
| 10,814,800 B1 | | 10/2020 | Gould |
| 10,824,055 B1 | | 11/2020 | Mcguire |
| 11,412,135 B2 | | 8/2022 | Scheich |
| 2001/0020933 A1 | | 9/2001 | Maggioni |
| 2002/0082860 A1 | | 6/2002 | Johnson |
| 2002/0085219 A1 | | 7/2002 | Ramamoorthy |
| 2002/0105513 A1 | | 8/2002 | Chen |
| 2002/0145660 A1 | | 10/2002 | Kanade et al. |
| 2003/0107568 A1 | | 6/2003 | Urisaka et al. |
| 2004/0078298 A1 | | 4/2004 | Fusama |
| 2006/0114531 A1 | | 6/2006 | Webb et al. |
| 2006/0182308 A1 | | 8/2006 | Gerlach et al. |
| 2006/0185550 A1 | | 8/2006 | Zanzucchi et al. |
| 2006/0256959 A1 | | 11/2006 | Hymes |
| 2007/0011083 A1 | | 1/2007 | Bird et al. |
| 2007/0035539 A1 | | 2/2007 | Matsumura et al. |
| 2007/0057815 A1 | | 3/2007 | Foy et al. |
| 2007/0172216 A1 | | 7/2007 | Lai |
| 2007/0211240 A1 | | 9/2007 | Matsumoto et al. |
| 2007/0230824 A1 | | 10/2007 | Alvarez |
| 2008/0106593 A1 | | 5/2008 | Arfvidsson et al. |
| 2008/0187182 A1 | | 8/2008 | Abe |
| 2008/0250585 A1 | | 10/2008 | Auer et al. |
| 2009/0043206 A1 | | 2/2009 | Towfiq et al. |
| 2009/0160930 A1 | | 6/2009 | Ruppert |
| 2010/0067801 A1 | | 3/2010 | Van Den Hengel et al. |
| 2010/0238290 A1 | | 9/2010 | Riley et al. |
| 2010/0306413 A1 | | 12/2010 | Kamay |
| 2011/0080487 A1 | | 4/2011 | Venkataraman et al. |
| 2011/0102744 A1 | | 5/2011 | Saad et al. |
| 2011/0221904 A1 | | 9/2011 | Swinford |
| 2012/0087643 A1 | | 4/2012 | Paramadilok |
| 2013/0057678 A1 | | 3/2013 | Prior et al. |
| 2013/0107041 A1 | | 5/2013 | Norem et al. |
| 2014/0009275 A1 | | 1/2014 | Bowers et al. |
| 2014/0118807 A1 | | 5/2014 | Su |
| 2014/0152806 A1 | | 6/2014 | Hauk |
| 2014/0192181 A1 | | 7/2014 | Taylor et al. |
| 2014/0235362 A1 | | 8/2014 | Fox et al. |
| 2014/0268627 A1 | | 9/2014 | Contreras et al. |
| 2015/0012168 A1 | | 1/2015 | Kuklish et al. |
| 2015/0077564 A1 | | 3/2015 | Swindord |
| 2015/0111601 A1 | | 4/2015 | Fagan |
| 2015/0227296 A1 | | 8/2015 | Pringle et al. |
| 2016/0001184 A1 | | 1/2016 | Sepulveda et al. |
| 2016/0100087 A1 | * | 4/2016 | Scheich ............... G06T 1/0007 348/47 |
| 2017/0051547 A1 | | 2/2017 | Albrecht |
| 2017/0148102 A1 | | 5/2017 | Franke et al. |
| 2017/0180696 A1 | | 6/2017 | Broughton |
| 2017/0264936 A1 | | 9/2017 | Depies et al. |
| 2018/0084224 A1 | | 3/2018 | Mcnelley et al. |
| 2018/0160019 A1 | * | 6/2018 | Scheich ............... G06T 1/0007 |
| 2019/0011806 A1 | | 1/2019 | Zilban et al. |
| 2019/0056483 A1 | | 2/2019 | Bradley et al. |
| 2019/0235737 A1 | | 8/2019 | Kuribayashi |
| 2019/0244336 A1 | | 8/2019 | Wakisaka et al. |
| 2019/0253701 A1 | | 8/2019 | Himel et al. |
| 2020/0173930 A1 | | 6/2020 | Alonie et al. |
| 2021/0144282 A1 | * | 5/2021 | Scheich ............... H04N 23/50 |
| 2022/0060633 A1 | * | 2/2022 | Dillow ............... H04N 23/695 |
| 2022/0101558 A1 | | 3/2022 | Mahajan et al. |
| 2022/0405519 A1 | | 12/2022 | Guzik et al. |
| 2023/0007934 A1 | | 1/2023 | Swinford |

FOREIGN PATENT DOCUMENTS

| | | |
|---|---|---|
| JP | S56132509 A | 10/1981 |
| JP | 2001013578 A | 1/2001 |
| WO | 2005022252 A1 | 3/2005 |
| WO | 2021021864 A1 | 2/2021 |

OTHER PUBLICATIONS

Credit Acceptance Corp, Guaranteed Credit Approval, Auto Loan; http://www.insider-car-buying-tips.com/credit_acceptance_corp.html; accessed Dec. 17, 2013.

Auto Success; Credit Acceptance's Upgraded Credit Approval Processing System Simplifies Approval Process; vol. 1 Issue 33; http://www.imakenews.com/autosuccess/e_article001075242.cfm?x=bgB6V1j,b7jJcq29,w; accessed Dec. 17, 2013.

Credit Acceptance Corp (CACC.OQ) Company Profile | Reuters.com; http://www.reuters.com/finance/stocks/companyProfile?symbol=CACC.OQ; accessed Dec. 17, 2013.

Credit Acceptance Corporation—Annual Report; United States Securities and Exchange Commission; Washington D. C. 20549; Form 10-K; Annual Report Pursuant to Section 13 or 15(d) of the Securities Exchange Act of 1934. http://www.ir.creditacceptance.com/secfiling.cfm?filingID=885550-13-18&CIK=885550; accessed Dec. 17, 2013.

* cited by examiner

MOBILE PHOTOBOOTH

CROSS REFERENCE TO RELATED APPLICATIONS

This application claims priority benefit of U.S. Provisional Application Ser. No. 63/163,174 filed 19 Mar. 2021, the contents of which are hereby incorporated by reference.

FIELD OF THE INVENTION

The present invention in general relates to a system for photographing vehicles; and in particular to a plane curve geometric shape inclusive photobooth that can form a generally cylindrical shape and that may be deployed in various indoor and outdoor settings.

BACKGROUND OF THE INVENTION

Auto auctions play a major role as a wholesale market for second-hand vehicles. Most auto auctions are closed auctions, meaning only dealers can use them. There are also auctions that are open to the public. These auctions are a primary outlet for financial services firms to dispose of their large volume of off-lease returns, for rental and other companies to sell off their aging fleets, and for car dealerships to dump trade-ins or other unwanted inventory. Some auctions are used by banks, the Internal Revenue Service, and other government agencies to sell vehicles that were repossessed for failure to make monthly payments or pay taxes, or were seized by the government agencies, or the police. Auctions are also used to sell U.S. Government vehicles.

Online auto auctions have also been growing in popularity. Popular online auctions to buy vehicles allow a user to create an account and put their vehicles up for auction. Furthermore, automotive dealerships are also now displaying images and videos of their inventories, while also allowing for the purchase of vehicles completely online.

Typically, online vehicle sales are based solely on images of the vehicle, since the buyer is in a remote location and is unable to view the vehicle in question in person. Thus, many high quality images are required of the vehicle from many perspectives to allow a buyer to gain an understanding of a subject vehicles condition and appearance. The photographer also has to manually collate the images, name, and upload the files, which is a labor intensive and time-consuming task, considering one photographer may be required to shoot upwards of 75 vehicles a day.

Furthermore, producing high quality images is not only time consuming, but is costly and requires a studio set up. Vehicle images are particularly hard to obtain without unwanted reflections of the photographer or the surroundings; however, reflection free images are critical to be able to discern surface imperfections, scratches, and dents on a vehicle surface.

While photography studio shots are effective in creating high quality vehicle images, the studio shots are not amenable to the high throughput required for high volume vehicle sales. Furthermore, vehicle inventory of dealerships is generally kept on outdoor lots, and most vehicle sellers do not have the floor space to dedicate to a full-time photographic studio stage. Individual sellers and low volume sellers lack the ability to complete quality vehicle images.

Thus, there is a need for a vehicle photographic booth that can be rapidly deployed and removed when not in use that is capable of producing high quality reflection free images of vehicles from multiple angles and perspectives. There is a further need for a deployable photobooth that can be deployed in both indoor and outdoor settings.

SUMMARY OF THE INVENTION

A deployable photobooth is provided for photographing vehicles. The photobooth includes a frame for support of one or more lighting elements and one or more joined rods, the one or more joined rods defining a plane curve. A fabric is draped from the one or more rods to form a generally circumferential wall of the photobooth. The plane curve geometric or even cylindrical shape of the photobooth avoids corner lighting issues common with square or rectangular shaped photobooths.

A process is provided for photographing a vehicle. The process includes driving the vehicle into the photobooth as described above and walking about the inside perimeter of the photobooth and taking a series of photographs with a camera, tablet, or smartphone shooting images or video. Subsequently, the obtained images or video are collected to form reflection free 360-degree images of the vehicle using a computer.

An outdoor photobooth is provided than may be deployed from a truck with a boom arm. The photobooth includes an attachment arm that joins to a hook from the boom arm, a carrier frame attached to the attachment arm, one or more lighting elements on said carrier frame, and a series of cables attached to the carrier frame that support one or more arc sections of tubing that are assembled to form a circumference. A fabric is attached to the tubing to form a cylindrical wall about a vehicle to be photographed.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

The present invention has utility as a system for photographing vehicles in a deployable curvilinear geometric shaped photobooth structure or even cylindrical photobooth structure. The plane curve geometric shaped or even cylindrical shape of the photobooth avoids corner lighting issues common with square or rectangular shaped photobooths. The walls of the photobooth in specific inventive embodiments are made of a heavy fabric, such as for example fabric used to divide gymnasium spaces but is opaque. A metal or aluminum frame, for example formed with a unistrut or other connectable tubular type members, supports photographic lighting, as well as one or more rods from which the fabric that forms the walls is hung. Embodiments of the inventive photobooth may itself be hung from a ceiling and deployed downward or retracted upward to the ceiling when needed to conserve floor space below. Embodiments of the deployable cylindrical photobooth may also be mobile and used in outdoor settings directly in an auto dealership parking and display lot. In embodiments that are not hung from a ceiling, vertical support legs may be used to support the frame above the floor or ground. Embodiments of the inventive deployable cylindrical photobooth may be used primarily for low volume car photos where a user walks about the inside perimeter of the photobooth and takes a series of photographs with a camera, tablet, or smartphone shooting images or video. The images or video may then be manipulated by computer to provide seamless reflection free 360 degree images.

In some inventive embodiments, a system is based on an IPAD® or IPHONE® or similar device that loads pictures directly to a web site. The images captured have controlled reflections from multiple angles and perspectives. A viewer is able to discern whether there are surface imperfections, scratches, and dents on a vehicle surface. Reflections are controlled in the in the circular chamber of the photobooth with curtain walls that are a light scattering sheet material such as a white canvas or gray walls, or a combination thereof. In specific embodiments a sunset style reflection on the vehicle surface is produced with the lower portion of the curtain wall being grey. A sunset style reflection refers to a hot horizon line on the vehicle with a rapid fall off (i.e., a sunset shot).

It is to be understood that in instances where a range of values are provided herein, that the range is intended to encompass not only the end point values of the range, but also intermediate values of the range as explicitly being included within the range and varying by the last significant figure of the range. By way of example, a recited range of from 1 to 4 is intended to include 1-2, 1-3, 2-4, 3-4, and 1-4.

Figure 3:
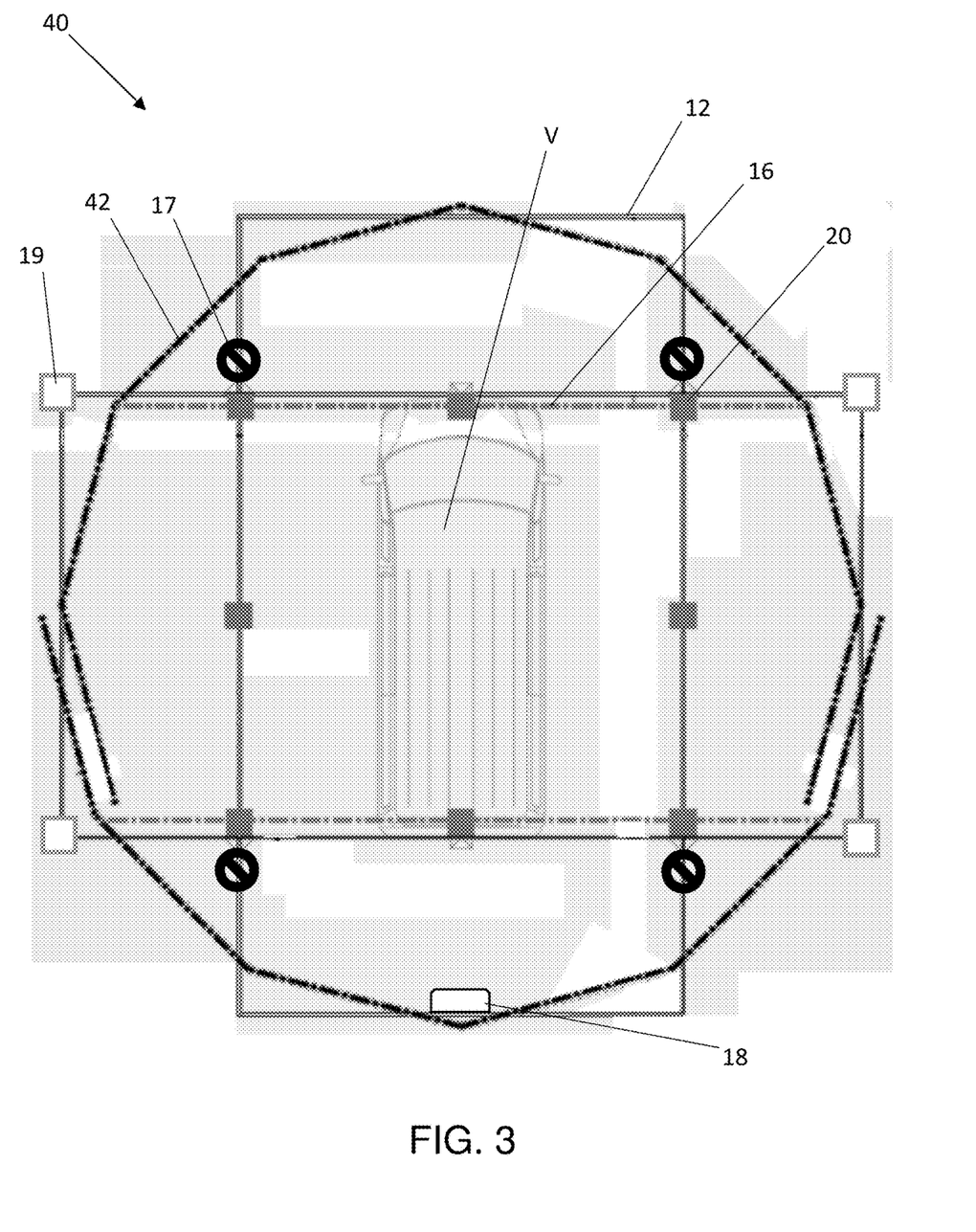
FIG. 3 is a top down view of a vehicle positioned in a deployable, geometric shaped photobooth with segmented walls in accordance with an embodiment of the invention.

It is appreciated that a plane curve shape, curvilinear shape, and a cylindrical shape are mathematical in nature and include continuously and smoothly transitioning lines or walls that are only approximated by the physical components of the present invention. These terms are intended to include discontinuities associated with complementary components relative to one another that approximate the shape, as well as linear sections with angular transitions therebetween. Exemplary versions of these approximations are shown in FIG. 3. Approximation of a given shape is provided when the R-squared fit is between 0.75 and 1.

Embodiments of the inventive deployable photographic booth allow for a complete set of multi perspective high quality vehicle images to be obtained and recorded into a template in less than 90 seconds, and in some instances in approximately 60 seconds. Any employee moving a vehicle from point A to point B can drive into embodiments of the deployable cylindrical booth, such as during vehicle delivery, moving into and out of a body shop or detailing shop, or moving the vehicle into position for auction. Thus, by the time the subject car is returned to its parking spot, the car is already available for sale online based on uploaded images and VIN uploaded information. The rapid processing time of the inventive deployable cylindrical photobooth structure booth provides images that are equivalent to existing photographic staging methods that take several minutes to several hours to obtain a set of vehicle images. The rapid image processing and recordation of vehicle condition allows for new business models such as creating virtual or cyber dealerships where a wholesale customer never takes possession of a subject vehicle, and the vehicle is dropped shipped to the end retail customer. Photos obtained with the inventive system may be sold along with the subject vehicle for use by a purchasing used car retailer, and as it typically takes four days for the buyer to take delivery of the wholesale vehicle, with instant access to the vehicle photos the purchaser can start advertising the vehicle four days prior to physically taking possession of the vehicle.

Embodiments of the inventive deployable cylindrical photobooth structure may utilize radio frequency identification (RFID) tags to identify and record vehicles as the vehicles are processed through the system. The RFID may be related to the vehicle identification number (VIN) of a vehicle to be processed. Information related to the vehicle, such as vehicle make, model, body style, and color encoded in the VIN may be used to automatically adjust lighting within the photobooth. Further information that may be related to the RFID may include a dealership setting that may also indicate which dealer the vehicle is being shot for and incorporate that dealer's specific preferences such as lighting style, file size and format, number of photo shots and angles to be recorded. RFID information may also be used to project text onto the background of the shot or overlay text onto the file during processing, such as price, dealer name, vehicle specifications, millage, etc. In a manual booth embodiment, knowing the make and model number could automatically tell the photographer where to stand and what pictures to take. In a specific inventive embodiment, a single overhead theater tracking light may direct the photographer where to stand to take a picture. As a result of preset angles and lighting, high quality images are collected in a fraction of time compared to an individual vehicle photo-session. Each photo would trigger the next light. The number of shots and positions in some inventive embodiments are determined by the RFID and data base information. Utilizing the optical tracker of embodiments of the invention, the program of where and how to shoot can be obtained by watching and recording a "real" photographer shoot a vehicle of similar body style.

Figure 1:
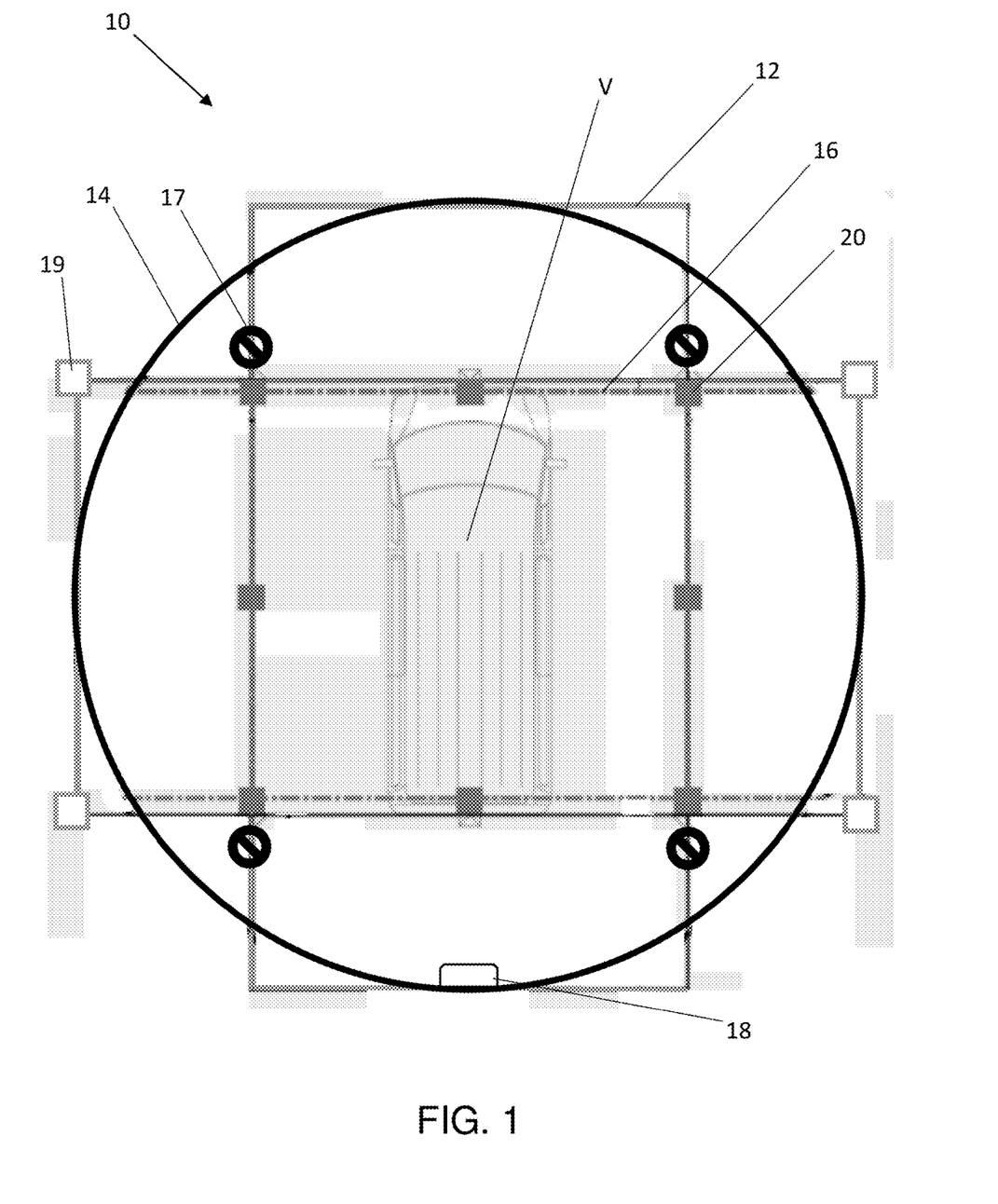
FIG. 1 is a top down view of a vehicle positioned in a deployable cylindrical photobooth in accordance with an embodiment of the invention.

Referring now to the figures, an embodiment of the inventive deployable cylindrical photographic booth is shown generally at 10 in FIG. 1. The deployable plane curve booth 10 is constructed with a frame 12 that supports one or more arc sections of tubing 14 on which a curtain wall 50 (see FIG. 4) is attached to the frame 12. In some inventive embodiments, the plane curve is closed to define a cylindrical shape. The frame is formed with vertical components and horizontal components supported on or above the vertical components. In some inventive embodiments, the tubing 14 is supported on the frame 12; while in other inventive embodiments, the tubing is freestanding. The curtain wall 50 is illustratively formed of fabric, canvas, polymeric sheeting, or laminates of any of the aforementioned. The frame 12 also supports a carrier frame 16 with one or more attached lighting elements 20. Attachment points 17 are provided on the frame 12 for hanging the photobooth 10 from a ceiling. In some inventive embodiments, legs 19 are provided to extend downward from the frame 12 when the photographic booth 10 is not suspended from a ceiling.

Figure 2A:
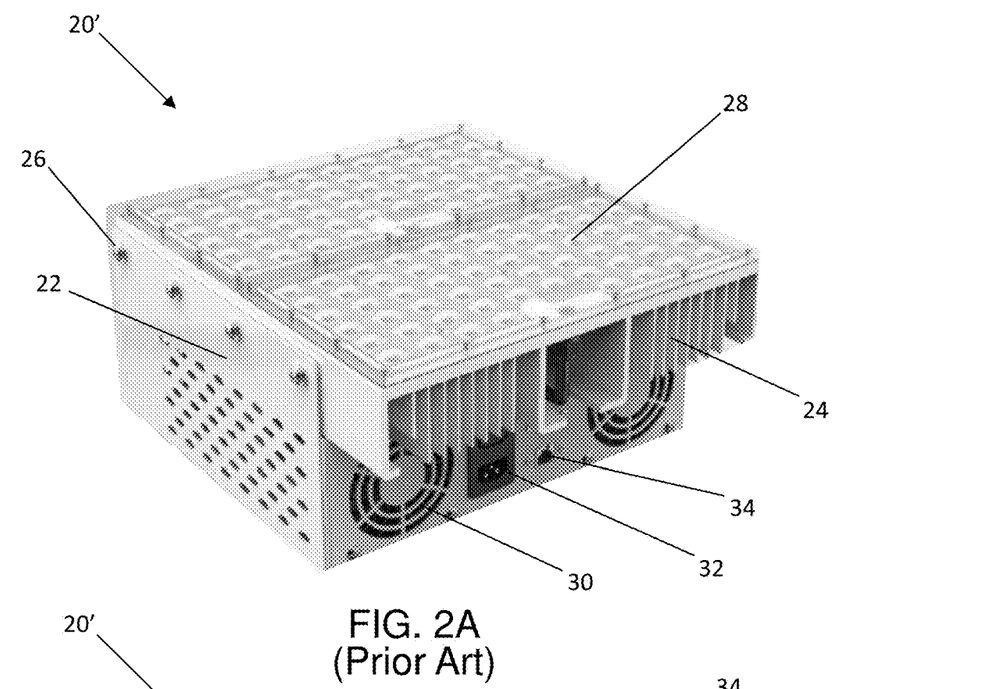
FIGS. 2A and 2B are perspective views of a prior art modular light fixture that may be used as a light in accordance with embodiments of the invention.
Figure 2B:
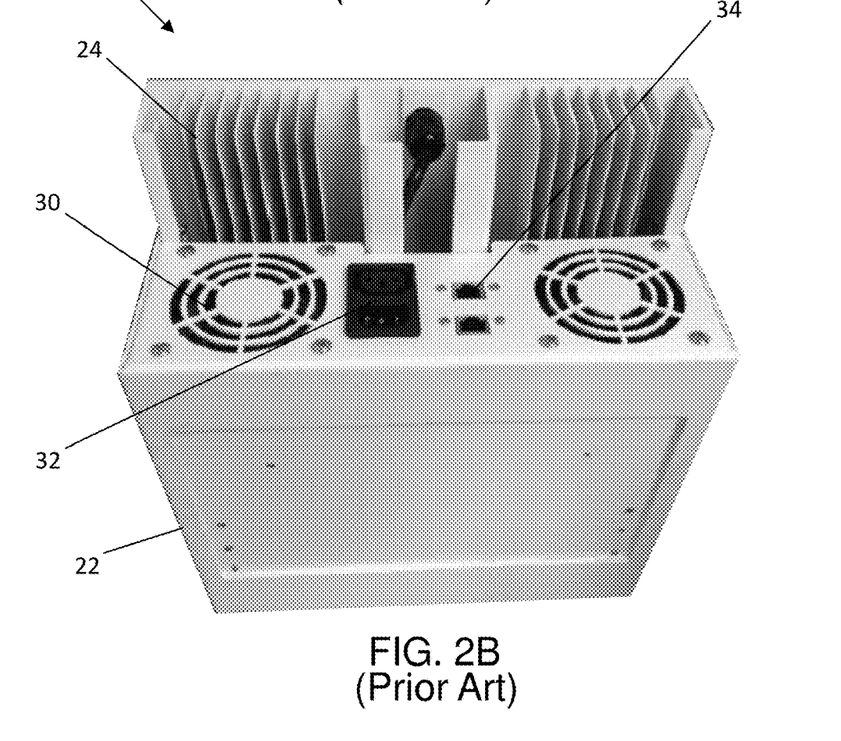

FIGS. 2A and 2B are perspective views of an embodiment of a modular light fixture 20' as disclosed in Patent Cooperation Treaty Application PCT/US20/43966 herein incorporated in its entirety. The modular light fixture 20' has a housing 22 that is secured to a heatsink 24 with securements 26. The heatsink 24 provides a surface that supports an array of lighting elements in a lighting lens 28. The heatsinks 24 spreads and dissipates heat generated by the lighting elements. One or more fans 30 provide cooling within the housing 22. Electrical connections 32 supply current to a transformer or power supply (not shown) within the housing 22. Control signal connections 34 supply signals for controlling the switching (on/off) and intensity and dimming of the array of lighting elements in a lighting lens 28. Individual lighting elements may be light emitting diodes (LED) held in the lighting lens 28. The individual lighting elements may be evenly spaced in a series of rows that form the array in the lighting lens 28. Different lighting lenses 28 may be used to create varying lighting effects. In a specific embodiment the color of the individual LEDs may be controlled.

FIG. 3 illustrates an embodiment of the inventive deployable photographic booth is shown generally at 40. In a similar manner to embodiment 10 shown in FIG. 1, deployable cylindrical booth 40 is constructed with a frame 12 that supports a series of segmented sections of tubing 42 that approximate a plane curve on which a curtain wall 50 (see FIG. 3) is attached to the frame. The curtain wall 50 is formed of the materials as detailed above. As the number of segmented sections 42 is increased (as shown twelve segments complete the circumference), a cylinder shape is approximated for the photobooth 40. The frame 12 also supports a carrier frame 16 with one or more attached lighting elements 20. Attachment points 17 are provided on the frame 12 for hanging the photobooth 40 from a ceiling. Optional legs 19 extend downward from the frame 12 when the photographic booth 10 is not suspended from a ceiling.

Figure 4:
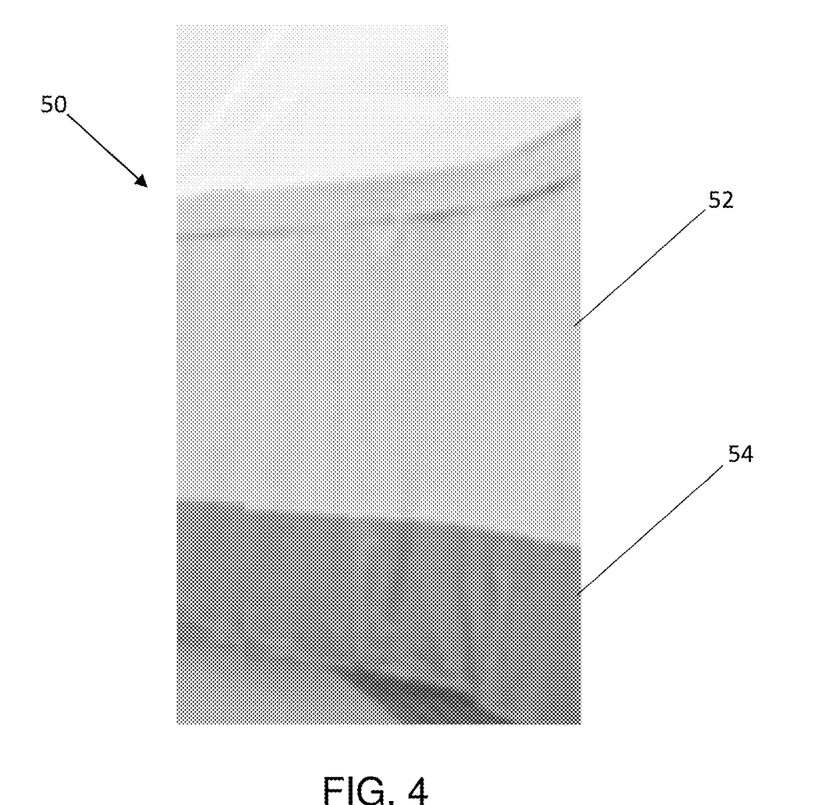
FIG. 4 is a partial perspective view of a curtain with an upper portion with a white reflective surface and a lower gray wall portion for use in embodiments of the deployable photobooth.

FIG. 4 illustrates an embodiment of the curtain wall with a light reflective upper portion 52 and a lower gray portion 54. It is appreciated that a totally white room would make a subject vehicle look flat and dull with no contrast, and there would be no accent of the vehicles natural body lines. The inventive deployable cylindrical structure employs a continuous 360 degrees of gray wall to produce a clean horizon line in the vehicle's reflections at all angles about the perimeter of the vehicle. The shape of the photobooth 10 or 40 wraps light around the front and rear of the vehicle while also wrapping the horizon reflection around the vehicle. As a result, the vehicle is photographed from multiple angles and still has the same high end look without the need to adjust the lighting or gray wall for each shot for a given subject vehicle.

The rounded walls used in the present invention act to preclude secondary reflections that negatively affect image quality. In specific embodiments RFID readers 18 are mounted at the entrance to read the identification tag associated with a subject vehicle. The driver of the vehicle in some embodiments may have an RFID name tag to track who shot the images or to monitor productivity. In inventive embodiments, the entrance has a covering cloth or curtain to create a uniform background in front corner camera shots having the entrance in the background thereof.

Figure 5:
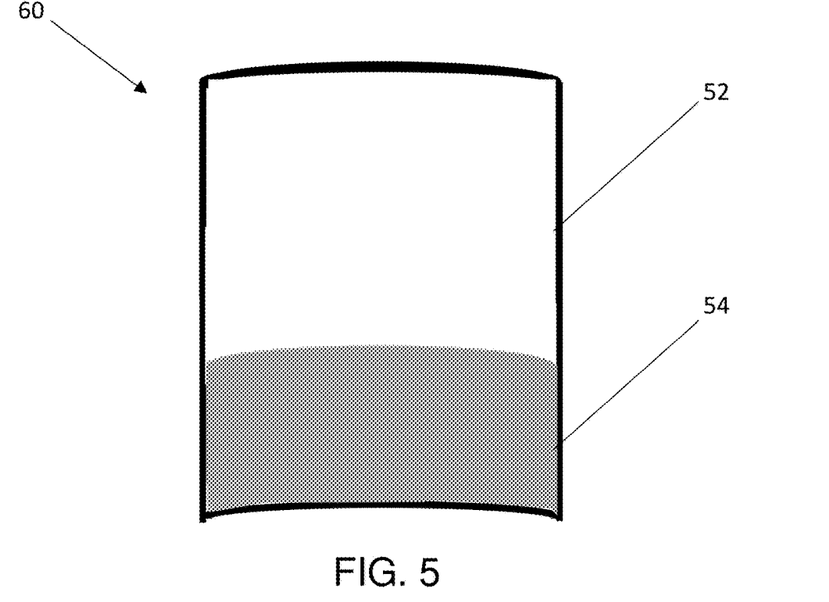
FIG. 5 is a front perspective view of a panel with an upper portion with a white light scattering surface and a lower gray wall portion for use in embodiments of the deployable photobooth.

FIG. 5 is a front perspective view of a panel 60 with an upper portion with a white reflective surface 52 and a lower gray wall portion 54 for use in embodiments of the deployable photobooth. Each of the panels 60 have an arc shape, and a series of panels 60 may be connected to form a complete circumference of a cylindrical photobooth with a curtain that can be pulled back to allow entry and exit of a vehicle to be photographed in the photobooth. In a similar manner to photobooths shown in FIGS. 1 and 3 a frame 12 supports a carrier frame 16 with one or more attached lighting elements 20.

Figure 6:
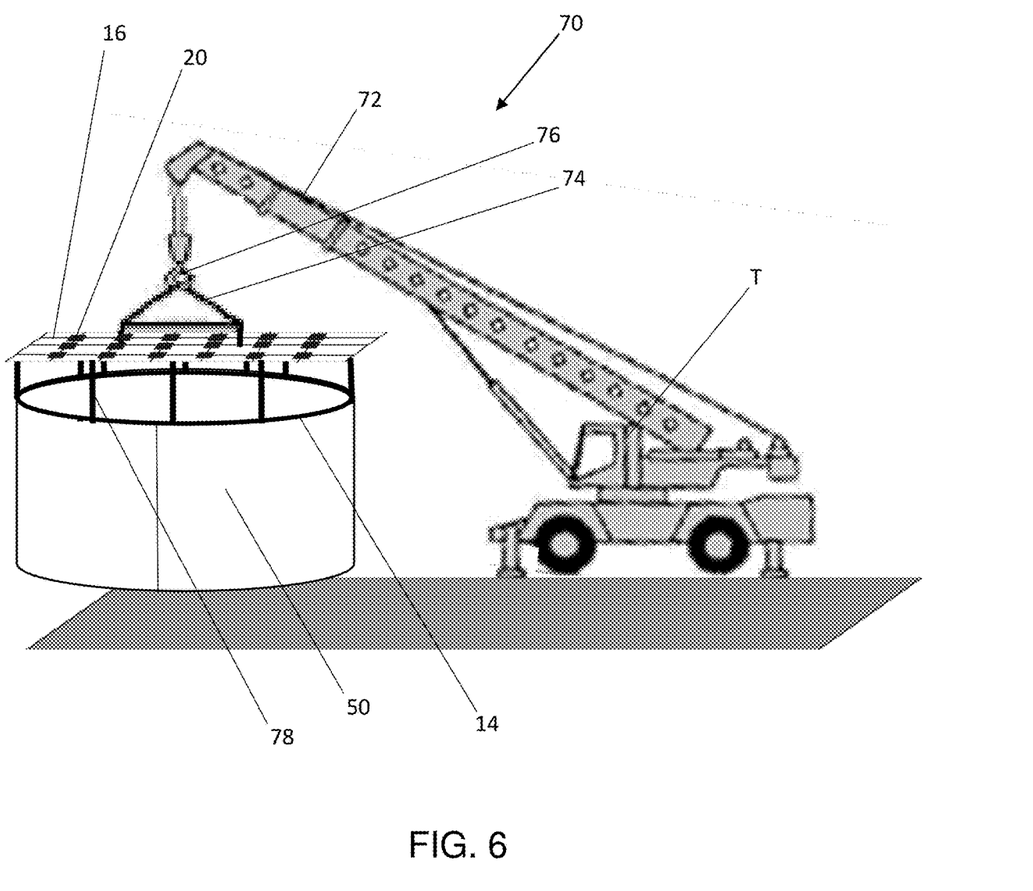
FIG. 6 illustrates the deployment of an outdoor curvilinear geometric shaped photobooth from the truck equipped with a boom in accordance with an embodiment of the invention.

FIG. 6 illustrates the deployment of an outdoor cylindrical photobooth 70 from a truck T equipped with a boom arm 72. Embodiments of the outdoor cylindrical photobooth 70 include an attachment arm 74 that joins to a hook 76 from the boom arm 72. The attachment arm 74 is attached to the carrier frame 16. The carrier frame 16 has one or more attached lighting elements 20. A series of cables 78 attached to the carrier frame 16 that supports one or more arc sections of tubing 14 that form a circumference on which a curtain wall 50 (see FIG. 4) is attached to the tubing 14.

Figure 7:
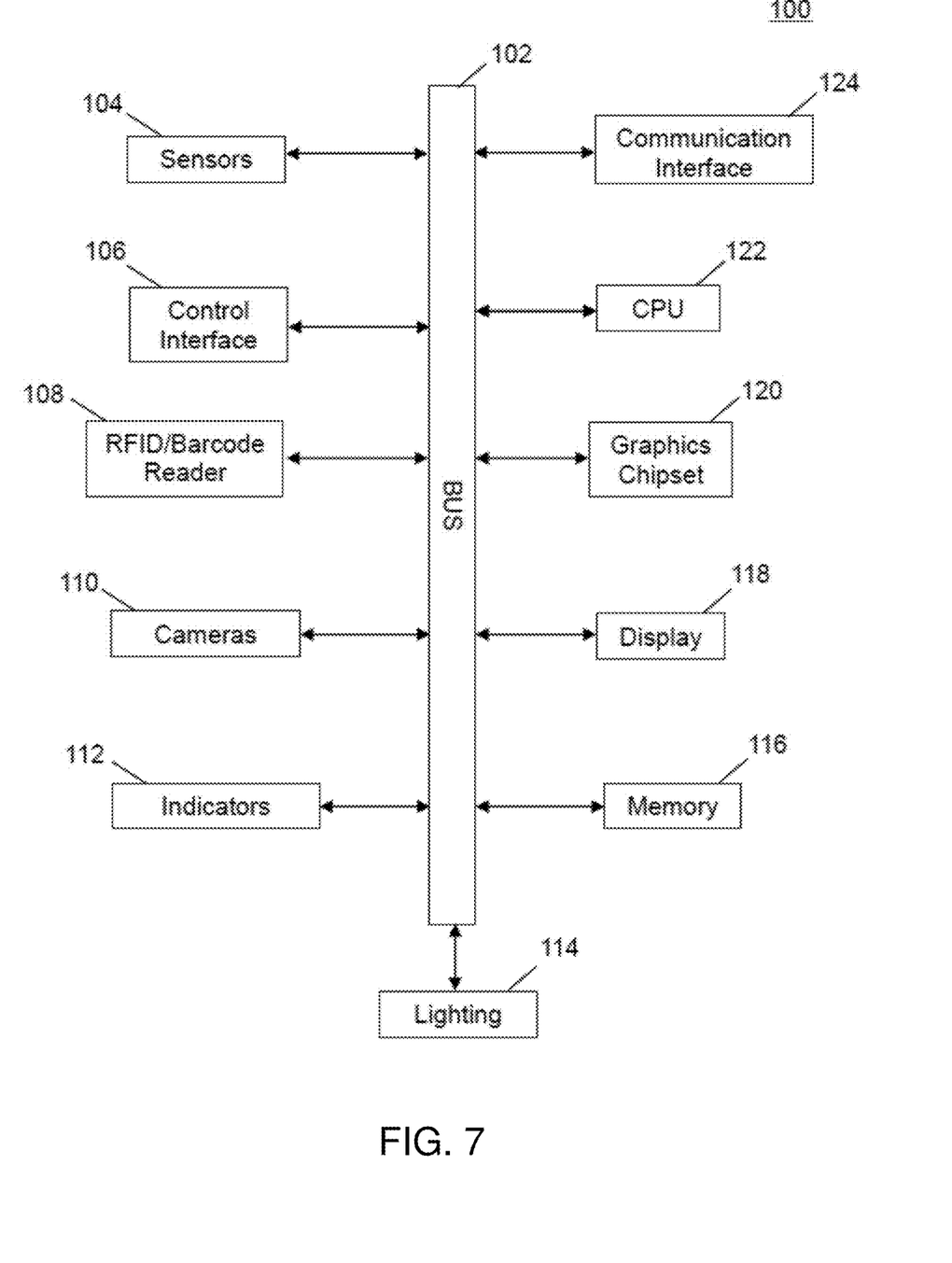
FIG. 7 is a system block diagram of the major components for photographing vehicles using embodiments of the deployable photobooth.

FIG. 7 is a system block diagram 100 of the major components for photographing vehicles. A central process unit (CPU) 122 coordinates and controls the overall operation of the photographing system 100 that may be operated in embodiments of the deployable photobooth (10, 40, 70). The communication interface 124 is representative of various links and input connections and devices illustratively including but not limited to wired and wireless links, optical drives, universal serial bus (USB), flash memory slot, and combinations thereof, for receiving and sending data that may or may not be in real time. The bus 102 links the various components in the system. Memory 116 serves as storage for operating programs and firmware for the photographic system 100. A database with vehicle and client information is stored in Memory 116. Memory 116 is made up of ROM and random access memory (RAM). Graphics chipset 120 drives a display 118. The display 118 may be liquid crystal display (LCD), light emitting diode (LED), or other known display technologies. Control interface 106 may include knobs, buttons, and other touch sensitive controls for selecting various menu items or for inputting alphanumeric information. Sensors 104 sense the presence of a vehicle and the vehicle position. RFID 108 is a reader that detects and interrogates tags mounted to vehicles or driver identification (ID) cards. Cameras 110 (if not manual) and lighting 114 are controlled and sequenced by the CPU 122. Indicators 112 provide visual feedback to system users.

As a person skilled in the art will recognize from the previous detailed description and from the figures and claims, modifications and changes can be made to the preferred embodiments of the invention without departing from the scope of this invention defined in the following claims.

The invention claimed is:

1. A photobooth for photographing vehicles, the photobooth comprising:
    a camera;
    one or more lights;
    a first rectangular frame;
    one or more attachment points coupled to the first rectangular frame, wherein the one or more attachment points are configured to couple to a ceiling;
    a second rectangular frame separate from, orthogonal to, supported by, and located above the first rectangular frame;
    one or more attachment arms coupled to the second rectangular frame, wherein the one or more attachment arms are configured to couple to a boom arm;
    one or more legs extending down from either the first rectangular frame or the second rectangular frame;

one or more rods coupled to the first rectangular frame and defining a closed shape around and above a vehicle placement portion of the photobooth; and a fabric draped from the one or more rods, the fabric forming a circumferential wall of the photobooth.

2. The photobooth of claim 1, further comprising a central processing unit (CPU) electrically coupled to the camera and the one or more lights, wherein the CPU is configured to automatically control at least one of the camera or the one or more lights when capturing images of the vehicle placement portion in the photobooth from multiple angles.

3. The photobooth of claim 2, wherein the CPU is further configured to automatically control the one or more lights to create a sunset photograph comprising a hot horizon line with a rapid falloff.

4. The photobooth of claim 1, wherein the fabric comprises a plurality of panels coupled to the one or more rods.

5. The photobooth of claim 1, further comprising an optical tracker for tracking a vehicle being photographed in the photobooth, the optical tracker configured to activate the one or more lights in a predefined sequence as the vehicle enters and exits the photobooth.

6. A method for creating a photobooth for photographing vehicles, the method comprising:
   supporting a second rectangular frame on a first rectangular frame, wherein the second rectangular frame is separate from, orthogonal to, and located above the first rectangular frame;
   coupling one or more attachment points to the first rectangular frame, wherein the one or more attachment points are configured to couple to a ceiling;
   coupling one or more attachment arms to the second rectangular frame, wherein the one or more attachment arms are configured to couple to a boom arm;
   coupling one or more legs to the first rectangular frame or the second rectangular frame, wherein the one or more legs extend downward from the first rectangular frame or the second rectangular frame;
   coupling one or more rods to the first rectangular frame, wherein the one or more rods define a closed shape around and above a vehicle placement portion of the photobooth;
   draping a fabric from the one or more rods, wherein the fabric forms a circumferential wall of the photobooth;
   coupling one or more lights to the photobooth; and
   interfacing a camera with the photobooth.

7. The method of claim 6, further comprising electrically coupling a central processing unit (CPU) electrically to the camera and the one or more lights, wherein the CPU is configured to automatically control the camera or the one or more lights when capturing images of the vehicle placement portion in the photobooth from multiple angles.

8. The method of claim 7, wherein the CPU is further configured to automatically control the one or more lights to create a sunset photograph comprising a hot horizon line with a rapid falloff.

9. The method of claim 6, wherein the fabric comprises a plurality of panels coupled to the one or more rods.

10. The method of claim 6, further comprising coupling an an optical tracker to the photobooth, wherein the optical tracker is for tracking a vehicle being photographed in the photobooth, and wherein the optical tracker configured to activate the one or more lights in a predefined sequence as the vehicle enters and exits the photobooth.

11. A method of operating a photobooth for photographing vehicles, the method comprising:
   moving a vehicle into the photobooth comprising:
      a camera;
      one or more lights;
      a first rectangular frame;
      one or more attachment points coupled to the first rectangular frame, wherein the one or more attachment points are configured to couple to a ceiling;
      a second rectangular frame separate from, orthogonal to, supported by, and located above the first rectangular frame;
      one or more attachment arms coupled to the second rectangular frame, wherein the one or more attachment arms are configured to couple to a boom arm;
      one or more legs extending down from either the first rectangular frame or the second rectangular frame;
      one or more rods coupled to the first rectangular frame and defining a closed shape around and above a vehicle placement portion of the photobooth; and
      a fabric draped from the one or more rods, the fabric forming a circumferential wall of the photobooth;
   activating the camera and the one or more lights to capture a photograph of the vehicle; and
   moving the vehicle out of the photobooth.

12. The method of claim 11, wherein the photobooth further comprises a central processing unit (CPU) electrically coupled to the camera and the one or more lights and the method further comprises causing the CPU to automatically control the camera or the one or more lights when capturing images of the vehicle in the photobooth from multiple angles.

13. The method of claim 12, wherein causing the CPU to automatically control the camera or the one or more lights comprises causing the CPU to automatically control the one or more lights to create a sunset photograph comprising a hot horizon line with a rapid falloff.

14. The method of claim 11, wherein the fabric comprises a plurality of panels coupled to the one or more rods.

15. The photobooth of claim 1, wherein the one or more rods define an approximately circular shape.

16. The photobooth of claim 1, further comprising one or more radio frequency identification (RFID) readers coupled proximate to an entrance to the photobooth, wherein the one or more RFID readers are configured to monitor user movement into and out of the photobooth.

17. The method of claim 6, wherein the one or more rods define an approximately circular shape.

18. The method of claim 6, further comprising coupling one or more radio frequency identification (RFID) readers proximate to an entrance to the photobooth, wherein the one or more RFID readers are configured to monitor user movement into and out of the photobooth.

19. The method of claim 11, wherein the one or more rods define an approximately circular shape.

20. The method of claim 11, further comprising monitoring user movement into and out of the photobooth via one or more radio frequency identification (RFID) readers proximate to an entrance to the photobooth.

* * * * *